(12) United States Patent
Gerasimov et al.

(10) Patent No.: US 8,804,759 B2
(45) Date of Patent: Aug. 12, 2014

(54) NETWORK NAME RESOLUTION INTO NETWORK ADDRESS

(75) Inventors: Sergey Gerasimov, El Cerrito, CA (US); Clay E. Olsen, Roseville, CA (US); Marc A. Sordi, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2574 days.

(21) Appl. No.: 11/364,238

(22) Filed: Feb. 28, 2006

(65) Prior Publication Data

US 2007/0201483 A1   Aug. 30, 2007

(51) Int. Cl.
*H04L 12/00* (2006.01)
*H04L 29/12* (2006.01)

(52) U.S. Cl.
CPC ........ *H04L 29/12358* (2013.01); *H04L 61/251* (2013.01)
USPC ...................................... 370/466

(58) Field of Classification Search
CPC ............... H04L 29/06142; H04L 29/12358; H04L 45/742; H04L 61/251; H04L 61/6086; H04L 69/167
USPC ......... 370/229, 225, 464–466, 475, 241, 252, 370/351, 352; 709/245, 249, 223, 10, 225, 709/227–229, 220
See application file for complete search history.

(56) References Cited

U.S. PATENT DOCUMENTS

| | | | |
|---|---|---|---|
| 6,324,585 B1 * | 11/2001 | Zhang et al. ................. | 709/245 |
| 6,580,717 B1 | 6/2003 | Higuchi et al. | |
| 6,912,219 B2 * | 6/2005 | Tsuchiya et al. .............. | 370/392 |
| 7,746,891 B2 * | 6/2010 | Yamamoto et al. ........... | 370/466 |
| 2003/0048804 A1 | 3/2003 | Inouchi et al. | |
| 2003/0225911 A1 | 12/2003 | Lee et al. | |
| 2004/0103212 A1 | 5/2004 | Takeuchi et al. | |
| 2004/0143579 A1 * | 7/2004 | Nakazawa ...................... | 707/10 |
| 2004/0153502 A1 | 8/2004 | Jiang | |
| 2004/0162909 A1 | 8/2004 | Choe et al. | |
| 2004/0215827 A1 | 10/2004 | Preguica et al. | |
| 2004/0233916 A1 | 11/2004 | Takeuchi et al. | |
| 2005/0182829 A1 * | 8/2005 | King et al. .................... | 709/220 |
| 2005/0267978 A1 | 12/2005 | Satapati | |
| 2006/0112176 A1 * | 5/2006 | Liu et al. ....................... | 709/223 |
| 2006/0165056 A1 * | 7/2006 | Komaki ......................... | 370/352 |

OTHER PUBLICATIONS

H. Afifi et al., "Methods for Ipv4-Ipv6 Transition," The Fourth IEEE Symposium on Computers and Communications, 1999.
"IPv6 support in the DNS," Ditche, Port Elizabeth, Sep. 2005.
Wikipedia entry for "domain name system," http://en.wikipedia.org, accessed from Internet, Dec. 20, 2005.

(Continued)

*Primary Examiner* — Paul H Masur

(57) ABSTRACT

A first domain name system (DNS) server of a first protocol type is requested to resolve a network name into a network address of the first protocol type. Where the network name is not resolved into a network address of the first protocol type by the first DNS server, a second DNS server of a second protocol type is requested to resolve the network name into a network address of the second protocol type. Where the first DNS server or the second DNS server resolves the network name into a network address, the network address into which the network name has been resolved is returned for access of a network resource at the network address and identified by the network name.

19 Claims, 3 Drawing Sheets

(56) References Cited

OTHER PUBLICATIONS

"Networking Ipv6 User Guide for J2SDK/JRE 1.4," http://java.sun.com, accessed from Internet, Dec. 20, 2005.
Wikipedia entry for "IPv6," http://en.wikipedia.org, accessed from Internet, Dec. 20, 2005.
M. Souissi, "DNS for the Ipv6 World," Ipv6 Conference, Paris, Oct. 28-30, 2002.
M. E. Fiuczynski et al., "The Design and Implementation of an IPv6/IPv4 Network Address and Protocol Translator," USENIX Annual Technical Conference, New Orleans, 1998.

* cited by examiner

NETWORK NAME RESOLUTION INTO NETWORK ADDRESS

BACKGROUND

Network resources, such as web servers hosting web sites, are typically accessible over the Internet by network addresses. For example, in accordance with the Internet Protocol (IP) version four, commonly referred to as IPv4, a network address at which a network resource is accessible is given as a.b.c.d, where each of a, b, c, and d is an integer between 0 and 255. As another example, in accordance with the IP version six, commonly referred to as IPv6, a network address is given as a:b:c:d:e:f:g:h, where each of a, b, c, d, e, f, g, and h is a hexadecimal number from 0x0000 to 0xFFFF. A given network resource may be accessible by an IPv4 address, by one or more IPv6 addresses, or by both an IPv4 address and one or more IPv6 addresses.

Because users have difficulty remembering network addresses, a domain name system (DNS) has been developed in which more easily remembered network names are associated with network resources. A given network resource may have a network name specified as "name" separated from each of a prefix "www" and a suffix "com" by a period ("."), for instance. When a user enters a network name by which a network resource is identified, such as within a web browser computer program, a DNS server is sent the network name to resolve the name into the actual network address of the resource. Thus, the network name may be resolved to an IPv4 network address a.b.c.d, and/or one or more IPv6 network addresses each having the form a:b:c:d:e:f:g:h.

Historically, network resources were accessible over the Internet via IPv4 network addresses only. However, for a variety of reasons, including primarily the concern that the number of unique IPv4 network addresses was running out, addressing is being slowly transmitioned to IPv6 network addresses, such that network resources will each ultimately become accessible by one or more IPv6 network addresses. During the transmition period, situations can thus occur in which a network resource may be accessible by an IPv4 address, one or more IPv6 addresses, or both an IPv4 address and one or more IPv6 addresses.

However, IPv4 DNS servers can only provide the IPv4 addresses of network resources. By comparison, IPv6 DNS servers primarily just provide the IPv6 addresses of network resources, although IPv6 DNS servers can in some instances provide IPv4 addresses as well. Therefore, when a network name is provided, there is an issue as to which DNS servers—IPv4 or IPv6—should be inquired to provide a network address, and in what order, especially in relation to a computing device that is capable of using both IPv4 and IPv6 addresses.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
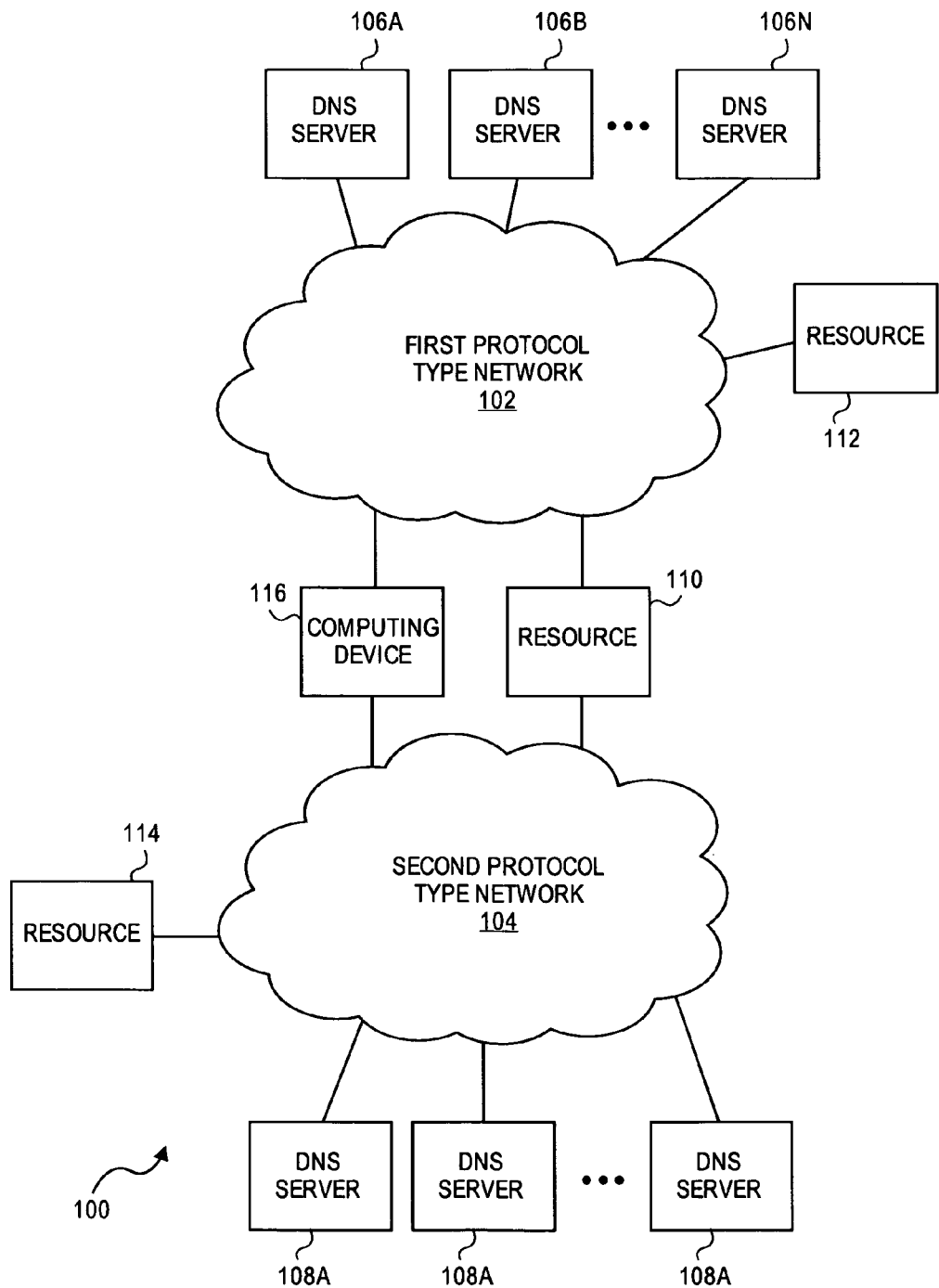
FIG. 1 is a diagram of a system in which there is a network of a first protocol type and a network of a second protocol type, according to an embodiment of the invention.

FIG. 1 shows a system 100, according to an embodiment of the invention. The system 100 includes two networks: a network 102 of a first protocol type, and a network 104 of a second protocol type. The network 102 may be an Internet Protocol (IP) version six, or IPv6, network, in which network resources are each addressable via one or more network addresses each given as a:b:c:d:e:f:g:h, where each of a, b, c, d, e, f, g, and h is a hexadecimal number from 0x0000 to 0xFFFF. The network 104 may be an IP version four, or IPv4, network, in which network resources are each addressable via a network address given as a.b.c.d, where each of a, b, c, and d is an integer between 0 and 255.

It is noted that the drawing of FIG. 1 depicts a logical, address-oriented view of the networks 102 and 104, and of the various devices, resources, and servers connected thereto. For instance, the computing device 116 may in actuality have a single physical interface that connects it to a physical network. The two connections depicted in relation to the computing device 116 in FIG. 1—one to the network 102 and another to the network 104—denote that the computing device 116 has two logical network addresses. That is, the computing device 116 has one network address for the first protocol type network 102, which is a portion of a physical network that is addressable in accordance with the first protocol type, and another address for the second protocol type network 104, which is a portion of a physical network that is addressable in accordance with the second protocol type. In other words, the two connections depicted in relation to the computing device 116 are not intended to be two separate physical interfaces to two separate physical networks, in one embodiment of the invention.

Embodiments of the invention are thus described in relation to the first protocol type being IPv6 and the second protocol type being IPv4 for descriptive clarity and convenience. However, those of ordinary skill within the art can appreciate that other embodiments can utilize other types of protocol types as well. Furthermore, in one embodiment, the first protocol type may be IPv4, and the second protocol type may be IPv6, instead of vice-versa as is primarily described herein.

Three exemplary network resources 110, 112, and 114 are depicted in FIG. 1. These network resources may be servers, such as web servers, network image-forming devices, such as inkjet and laser printers, as well as other types of computing and other devices. The resource 110 is addressable by both an IPv4 address and one or more IPv6 addresses, since it is communicatively connected to both the network 104 and the network 102. By comparison, the resource 112 is addressable just by one or more IPv6 addresses, since it is communicatively connected to just the network 102. Similarly, the resource 114 is addressable just by an IPv4 address, since it is communicatively connected to just the network 104.

The first protocol type network 102 includes a number of domain name system (DNS) servers 106A, 106B, . . . , 106N, collectively referred to as the DNS servers 106. As can be appreciated by those of ordinary skill within the art, each of the DNS servers 106 is capable of resolving a network name by which a network resource is identified into a network address at which the network resource is accessible. Where the first protocol type is IPv6, the DNS servers 106 resolve each such network name into at least one or more IPv6 addresses, since in accordance with IPv6, a given network resource can have more than one network address.

However, for descriptive clarity and convenience only, it is primarily relied upon herein that a network name is resolved into one such network address, where it is implied that in actuality the network name may be resolvable into more than one IPv6 address. Furthermore, the DNS servers 106 may be able to resolve a network name into an IPv4 address in addition to one or more IPv6 addresses. Again, however, for descriptive clarity and convenience only, this capability of such IPv6 DNS servers 106 is substantially ignored herein, such that the primary concern and function of IPv6 DNS servers 106 as described and relied upon herein are their ability to resolve network names into IPv6 addresses.

The second protocol type network 104 also includes a number of DNS servers 108A, 108B, . . . , 108M, collectively referred to as the DNS servers 108. As can be appreciated by those of ordinary skill within the art, each of the DNS servers 108 is capable of resolving a network name by which a network resource is identified into a network address at which the network resource is accessible. Where the second protocol type is IPv4, the DNS servers 108 resolve each such network name into one IPv4 address, in accordance with IPv4, in which a given network resource can have just one such network address.

Therefore, the DNS servers 106 are able to resolve the network names of the resources 110 and 112 into IPv6 addresses, and the DNS servers 108 are able to resolve the network names of the resources 110 and 114 into IPv4 addresses. The DNS servers 106 cannot resolve the network name of the resource 114, since the resource 114 is communicatively connected to just the network 104 and not to the network 102. Similarly, the DNS servers 108 cannot resolve the network name of the resource 112, since the resource 112 is communicatively connected to just the network 102 and not to the network 104.

The computing device 116 receives the network names by which the network resources 110, 112, and 114 are identified, such as, for instance, by a user entering these network names into a web browser computer program running on the computing device 116. Different examples and implementations of the computing device 116 are described later in the detailed description. Because the computing device 116 is connected to both the networks 102 and 104, it is capable of accessing network resources at IPv6 addresses as well as at IPv4 addresses. Thus, the computing device 116 can access the resource 112 at its IPv6 address, the resource 110 either at its IPv6 address or at its IPv4 address, and the resource 114 at its IPv4 address.

However, in another embodiment, the computing device 116 may only be able to access the IPv6 network 102 or the IPv4 network 104, and not both the networks 102 and 104. Where the computing device 116 is only able to access the IPv6 network 102, it may access the resource 110 at its IPv6 address, or via translation of the IPv4 address of the resource 110 to an IPv6 address, as can be appreciated by those of ordinary skill within the art. Similarly, where the computing device 116 is only able to access the IPv6 network 102, it may access the resource 114 via translation of the IPv4 address of the resource 114 to an IPv6 address, as can be appreciated by those of ordinary skill within the art.

Where the computing device 116 is only able to access the IPv4 network 104, it may access the resource 110 at its IPv4 address, or via translation of the IPv6 address of the resource 110 to an IPv4 address, as can be appreciated by those of ordinary skill within the art. Similarly, where the computing device 116 is only able to access the IPv4 network 104, it may access the resource 112 via translation of the IPv6 address of the resource 112 to an IPv4 address, as can be appreciated by those of ordinary skill within the art. The particulars of such IPv4 address-to-IPv6 address translation, and of such IPv6 address-to-IPv4 address translation, however, are beyond the purview of embodiments of the present invention, and any such address translation technique can be employed in relation to embodiments of the invention.

Embodiments of the invention are concerned with how the computing device 116 inquires the IPv6 DNS servers 106 and the IPv4 DNS servers 108, and in what order, to resolve received network names into network addresses at which network resources, such as the resources 110, 112, and 114, can be accessed. For example, the computing device 116, for a given network name, may not know whether the network resource associated with and identified by this network name is addressable by and accessible at an IPv6 address, an IPv4 address, or both an IPv6 address and an IPv4 address. Therefore, what follows is the description of an approach by which the computing device 116 particularly inquires the IPv6 DNS servers 106 and the IPv4 DNS servers 108, in a specified order, to resolve a network name into a network address to access a network resource.

It is noted that whereas the embodiment of FIG. 1 has been described where there are IPv6 DNS servers 106 and IPv4 DNS servers 108, in another embodiment of the invention, there may be a single group of DNS servers, logically connected to both the IPv4 network 104 and the IPv6 network 102, that is able to provide both IPv6 addresses and IPv4 addresses, as can be appreciated by those of ordinary skill within the art.

Figure 2:
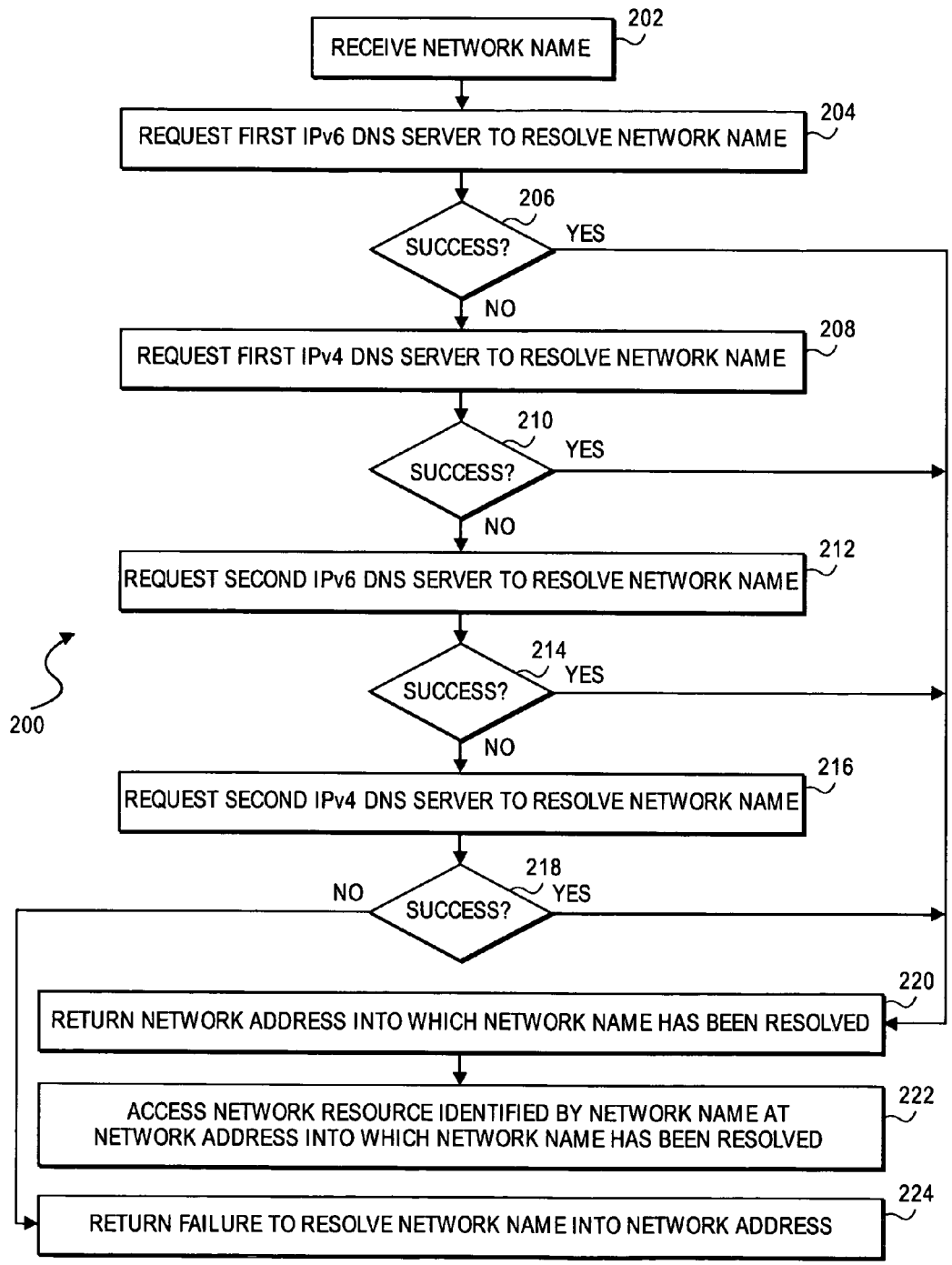
FIG. 2 is a flowchart of a method for resolving a network name into a network address of a first protocol type or a network address of a second protocol type in a particular manner, according to an embodiment of the invention.

FIG. 2 shows a method 200 for resolving a network name by which a network resource is identified with a network address at which the network resource can be accessed, according to an embodiment of the invention. The method 200 may be performed by the computing device 116 within the system 100 of FIG. 1, for instance, in one embodiment of the invention. The method 200 is particularly described in relation to an embodiment in which there are two IPv6 DNS servers 106, the servers 106A and 106B, and two IPv4 DNS servers 108, the servers 108A and 108B. As can be appreciated by those of ordinary skill within the art, however, the method 200 is easily extended to scenarios in which there are more than two and/or less than two of the DNS servers 106 and/or of the DNS servers 108.

First, the network name to be resolved into a network address is received (202), such as, for instance, by a user entering the name into a web browser computer program running on the computing device 116. Alternatively, a printing or other type of imaging device, such as a scanning device, may be configured by a user, such that, for instance, the network name is entered as part of the configuration process of the device. The first, or primary, IPv6 DNS server 106A is then requested to resolve the network name into an IPv6 network address (204). The DNS server 106A may successfully resolve the network name into an IPv6 network address, or it may be unsuccessful.

For instance, the network name not being resolved into an IPv6 network address by the DNS server 106A may include the DNS server 106A failing to resolve the specified name into an address. The DNS server 106A may not have this network name stored as mapping to a given IPv6 network address, for instance, or the network name may be associated with a network resource that is addressable just by an IPv4 network address, and not by an IPv6 network address. As another example, the network name not being resolved into an IPv6 network address by the DNS server 106A may include the DNS server 106A timing out after submission of the request to the server 106A. The DNS server 106A may be offline, for instance, or otherwise presently inaccessible.

Therefore, if the network name is not resolved into an IPv6 address by the DNS server 106A (206), then the first, or primary, IPv4 DNS server 108A is requested to resolve the network name into an IPv4 network address (208). The DNS server 108A may successfully resolve the network name into an IPv4 address, or it may be unsuccessful. If the network name is not resolved into an IPv4 address by the DNS server 108A (210), then the second, or secondary, IPv6 DNS server 106B is requested to resolve the network name into an IPv6 network address (212). The DNS server 106B may successfully resolve the network name into an IPv6 address, or it may be unsuccessful.

If the network name is not resolved into an IPv6 address by the DNS server 106B (214), then the second, or secondary, IPv4 DNS server 108B is requested to resolve the network name into an IPv4 network address (216). The DNS server 108B may successfully resolve the network name into an IPv4 address, or it may be unsuccessful: If the network name is not resolved into an IPv4 address by the DNS server 108B (218), then the method 200 returns that there has been a failure to resolve the network name into a network address (224). This is because none of the DNS servers 106A, 106B, 108A, and 108B were able to successfully resolve the network name into a network address. Alternatively, a different mechanism or a methodology may be employed to resolve the network name into a network address, instead of returning a failure in part 224 of the method 200.

However, where the DNS server 106A resolves the network name into an IPv6 address (206), where the DNS server 108A resolves the network name into an IPv4 address (210), where the DNS server 106B resolves the network name into an IPv6 address (214), or where the DNS server 108B resolves the network name into an IPv4 address (218), the following is performed. First, the network address into which the network name has been resolved is returned (220). Thereafter, the network resource identified by this network name is or can be accessed at the network address into which the network name has been resolved (222). For example, in the case of a web server, the web site hosted by the web server may be displayed on the computing device 116.

It is noted that where the first IPv6 DNS server 106A or the second IPv6 DNS server 106B successfully resolves the network name into a network address, the network address at which the network resource associated with this network name is accessed is an IPv6 address. Similarly, where the first IPv4 DNS server 108A or the second IPv4 DNS server 108B successfully resolves the network name into a network address, the network address at which the network resource associated with this network name is accessed is an IPv4 address.

Where the computing device 116 that may be performing the method 200 is capable of accessing both the IPv6 network 102 and the IPv4 network 104, it does not matter whether an IPv4 address or an IPv6 address is returned for the network name identifying the network resource in question, because the device 116 is typically always able to access the resource at the returned address. That is, the computing device 116 may not care whether the network name it provides is resolved into an IPv4 address or an IPv6 address, where the device 116 is capable of accessing both the IPv6 network 102 and the IPv4 network 104.

It is thus noted that the general approach particularly embodied in the method 200 is that first protocol type DNS servers and second protocol type DNS servers are alternatingly requested to resolve the network name into a network address of their particular protocol type until, desirably, the network name is resolved into a network address of either protocol type. That is, first a first protocol type DNS server is requested to resolve the network name into a first protocol type address. If the network name is incapable of being thus resolved, a second protocol type DNS server is requested to resolve the network name into a second protocol type address.

However, if the network name is still incapable of being resolved, another first protocol type DNS server is requested to resolve the network name into a first protocol type address. If the network name is then still incapable of being resolved, another second protocol type DNS server is requested to resolve the network name into a second protocol type address. This process continues until there are no more DNS servers of either the first protocol type or the second protocol type to request network name resolution into a network address, or until a given DNS server has successfully resolved the network name into a network address, whichever comes first.

In at least one embodiment of the invention, the method 200 does not translate IPv6 network addresses to IPv4 network addresses, or vice-versa. That is, the IPv6 network address into which the first IPv6 DNS server may resolve the network name in part 204, or into which the second IPv6 DNS server may resolve the network name in part 212, is not translated into an IPv4 network address. Similarly, the IPv4 network address into which the first IPv4 DNS server may resolve the network name in part 208, or into which the second IPv4 DNS server may resolve the network name in part 216, is not translated into an IPv6 network address. This is because the computing device 116 is in such embodiments able to access both the IPv6 network 102 and the IPv4 network 102 directly, such that no such IPv4 address-to-IPv6 address or IPv6 address-to-IPv4 address translation is necessary.

Figure 3A:
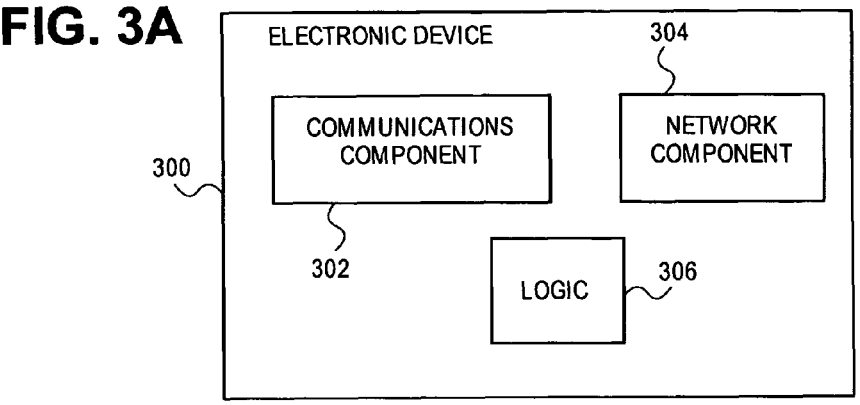
FIGS. 3A, 3B, and 3C are rudimentary diagrams of devices in which network name-to-network address resolution can be implemented, according to varying embodiments of the invention.
Figure 3B:
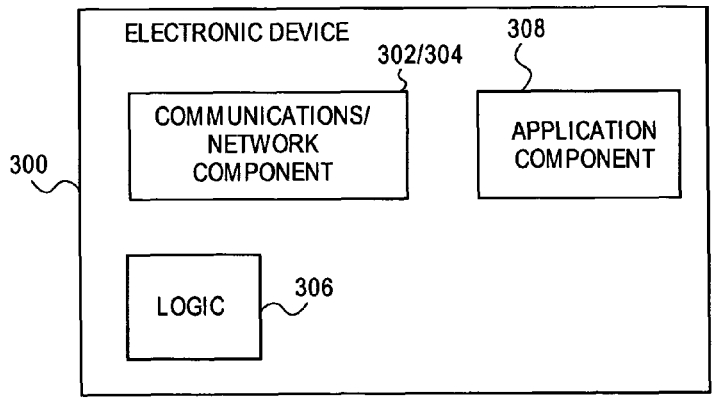
Figure 3C:
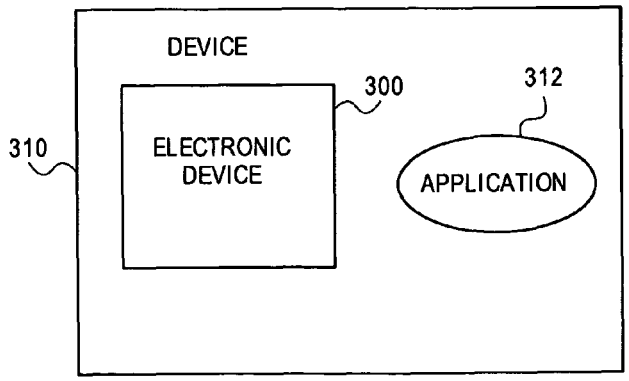

FIGS. 3A, 3B, and 3C depict devices that can implement the network name-to-network address resolution methodology that has been described, according to an embodiment of the invention. As can be appreciated by those of ordinary skill within the art, other devices besides those depicted in FIGS. 3A, 3B, and 3C can also implement the resolution methodology that has been described. As can also be appreciated by those of ordinary skill within the art, the devices of FIGS. 3A, 3B, and 3C can and typically will include other components, in addition to and/or in lieu of those depicted in FIGS. 3A, 3B, and 3C. The devices of FIGS. 3A, 3B, and 3C can act as or implement the device 116 of FIG. 1 that has been described, in some embodiments of the invention.

In FIG. 3A, an electronic device 300 is shown that includes a communications component 302, a network component 304, and logic 306. The communications component 302 and the logic 306 may be implemented in software, firmware and/or hardware, whereas the network component 304 is typically implemented in hardware. The communications component 302 is to receive a network name associated with a network resource from an application, such as a web browser program or another type of application. The component 302 is also to send the network address into which the network name has been resolved back to the application for access of the network resource by the application at the address provided.

The network component 304 is to communicatively connect the electronic device 300 to a number of DNS servers of a first protocol type and a number of DNS servers of a second protocol type. The network component 304 may thus be or include a wired or a wireless network adapter. The logic 306, by comparison, is to alternatingly request the DNS servers of the first and the second protocol types to resolve the network name into a network address until one of the DNS servers resolves the network name into a network address, as has been described. Thus, the logic 306 receives the network name via the communications component 302, requests the DNS servers for network name resolution via the network component 304, and returns the resulting network address via the component 302.

In FIG. 3B, the device 300 is particularly implemented as a computing device, such as a laptop or desktop computer, and so on. In the embodiment of FIG. 3B, the communications and network components are implemented as a single component 302/304, as opposed to separate components 302 and 304 as in the embodiment of FIG. 3A. Furthermore, the device 300 is depicted in FIG. 3B as including an application component 308 at which the application that generates the network name is situated. For instance, the component 308 may be the software running on the device 300, such as an operating system on which the application is running. The logic 306 may be part of the component 308 in one embodiment, although this is not depicted in FIG. 3B. Furthermore, the device 300 of FIG. 3A may include the component 308, but this is not depicted in FIG. 3A.

Finally, in FIG. 3C, the electronic device 300 is particularly implemented as a communications peripheral that is connectable to and/or within another device 310. For instance, the device 310 may be a printing device, such as a laser printer, or an imaging device, such as a scanner, which is receptive to a communications card implemented as the device 300 in order for the printing device to have networking and/or communications capability. As such, the device 310 may include an application 312 that generates the network name that is resolved into a network address in accordance with the methodology that has been described. It is noted that the application 312 may also be part of the electronic device 300, instead of part of the device 310.

It is noted, therefore, that although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. For instance, the terminology computing device as used herein is employed in a general and encompassing sense, such that this terminology is inclusive of laptop and desktop computers, as well as other types of devices that have computing capability in some way, such as printing devices like inkjet and laser printers. It is thus manifestly intended that this invention be limited only by the claims and equivalents thereof.

We claim:

1. A method performed by a computing device, the method comprising:

requesting, by the computing device, a first domain name system (DNS) server of a first protocol type to resolve a network name into a network address of the first protocol type;

only where the network name is not resolved into a network address of the first protocol type by the first DNS server, requesting, by the computing device, a second DNS server of a second protocol type to resolve the network name into a network address of the second protocol type; and, where the first DNS server or the second DNS server resolves the network name into a network address,
receiving by the computing device from the first DNS server or the second DNS server, the network address into which the network name has been resolved for access of a network resource at the network address and identified by the network name,
accessing, by the computing device, the network resource at the network address into which the network name has been resolved.

2. The method of claim 1, wherein where the first DNS server resolves the network name into a network address, the network address is a network address of the first protocol type, and where the second DNS server resolves the network name into a network address, the network address is a network address of the second protocol type.

3. The method of claim 1, further comprising:
where the network name is not resolved into a network address of the second protocol type by the second DNS server,
requesting, by the computing device, a third DNS server of the first protocol type to resolve the network name into a network address of the first protocol type; and,
where the third DNS server resolves the network name into a network address of the first protocol type, receiving by the computing device from the third DNS server, the network address of the first protocol type for access of the network resource at the network address of the first protocol type.

4. The method of claim 3, further comprising:
where the network name is not resolved into a network address of the first protocol type by the third DNS server,
requesting, by the computing device, a fourth DNS server of the second protocol type to resolve the network name into a network address of the second protocol type; and,
where the fourth DNS server resolves the network name into a network address of the second protocol type, receiving by the computing device from the fourth DNS server, the network address of the second protocol type for access of the network resource at the network address of the second protocol type.

5. The method of claim 1, further comprising:
alternatingly requesting, by the computing device, additional DNS server's of the first protocol type and additional DNS server's of the second protocol type to resolve the network name into a network address until one of the additional DNS server's resolves the network name into a network address; and,
receiving, by the computing device, the network address into which the network name has been resolved for access of the network resource at the network address.

6. The method of claim 1, further comprising initially receiving the network name to be resolved into a network address of the first protocol type or of the second protocol type.

7. The method of claim 1, wherein the network name not being resolved into a network address of the first protocol type by the first DNS server comprises the first DNS server failing to resolve the network name into a network address of the first protocol type.

8. The method of claim 1, wherein the network name not being resolved into a network address of the first protocol type by the first DNS server results in the first DNS server timing out.

9. The method of claim 1, wherein the first protocol type is Internet Protocol (IP) version six, and the second protocol type is IP version four.

10. An electronic device comprising:
- a communications component to receive a network name associated with a network resource from an application and to send a network address into which the network name has been resolved to the application for access of the network resource by the application at the network address;
- a network component to communicatively connect the electronic device to a plurality of domain name system (DNS) servers of a first protocol type and to a plurality of DNS servers of a second protocol type; and,
- logic to alternatingly request the DNS servers of the first protocol type and the DNS servers of the second protocol type to resolve the network name into a network address until one of the DNS servers resolves the network name into a network address.

11. The electronic device of claim 10, wherein where one of the DNS servers of the first protocol type resolves the network name into a network address, the network address is a network address of the first protocol type, and where one of the DNS servers of the second protocol type resolves the network name into a network address, the network address is a network address of the second protocol type.

12. The electronic device of claim 10, wherein the communications component is the network component.

13. The electronic device of claim 10, wherein the communications component is separate from the network component.

14. The electronic device of claim 10, wherein the communications component is implemented in software.

15. The electronic device of claim 10, wherein the communications component is implemented in hardware.

16. The electronic device of claim 10, wherein the logic is implemented in one of software and hardware.

17. The electronic device of claim 10, further comprising another component at which the application is implemented.

18. The electronic device of claim 10, wherein the first protocol type is Internet Protocol (IP) version six, and the second protocol type is IP version four.

19. An electronic device comprising:
- a communications component to receive a network name associated with a network resource from an application and to send a network address into which the network name has been resolved to the application for access of the network resource by the application at the network address;
- a network component to communicatively connect the electronic device to a plurality of domain name system (DNS) servers of a first protocol type and to a plurality of DNS servers of a second protocol type; and,
- means for alternatingly requesting the DNS servers of the first protocol type and the DNS servers of the second protocol type to resolve the network name into a network address until one of the DNS servers resolves the network name into a network address.

* * * * *